United States Patent [19]

Leoni et al.

[11] Patent Number: 4,717,746

[45] Date of Patent: Jan. 5, 1988

[54] ADHESION PROMOTERS OF PLASTISOLS, CAPABLE OF MAINTAINING PLASTISOL COLOR STABLE TOWARDS THE EFFECT OF THE APPLICATION THERMAL TREATMENT

[75] Inventors: Roberto Leoni; Angela Rossini, both of Milan; Massimo Taccani, Arcore, all of Italy

[73] Assignee: Chem-Plast, Milan, Italy

[21] Appl. No.: 759,184

[22] Filed: Jul. 26, 1985

[30] Foreign Application Priority Data

Aug. 2, 1984 [IT] Italy .................. 22208 A/84

[51] Int. Cl.$^4$ .................. C08K 5/34; C08G 63/54
[52] U.S. Cl. .................. 524/100; 528/295.3; 528/332; 528/341
[58] Field of Search .................. 528/295.3, 332, 341; 524/100

[56] References Cited

U.S. PATENT DOCUMENTS

| Re. 28,533 | 8/1975 | Drawert et al. | 528/295.3 |
|---|---|---|---|
| 3,396,180 | 8/1968 | Floyd et al. | 528/295.3 |
| 4,182,845 | 1/1980 | Yeakey et al. | 528/341 |
| 4,207,217 | 1/1980 | Guainazzi et al. | 528/295.3 |

Primary Examiner—John Kight
Assistant Examiner—M. L. Moore
Attorney, Agent, or Firm—Charles E. Brown; Charles A. Brown

[57] ABSTRACT

The object of the invention are adhesion promoters for plastisols of polyvinylchloride polymers or copolymers, characterized in that they are constituted by polyaminoamidic resins obtained by means of the condensation of:

1 equivalent of carboxylic acids, obtained by polymerization of unsaturated fatty acids, of composition comprised within the following ranges: 0–2% monomers, 10–50% dimers, 50–90% trimers, with from 1.0 to 2.2 equivalents of an heterocyclic amine of general formula

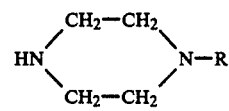

wherein R can be H or an alkylamino group —R'—NH$_2$, wherein R' is a saturated alifatic chain.

11 Claims, No Drawings

ADHESION PROMOTERS OF PLASTISOLS, CAPABLE OF MAINTAINING PLASTISOL COLOR STABLE TOWARDS THE EFFECT OF THE APPLICATION THERMAL TREATMENT

It is known that plastisols are essentially constituted by a liquid dispersion of a polymer or copolymer of vinyl chloride in the form of a powder inside a plastifier, in which the polymer must not be soluble to an appreciable extent at room temperature.

When these plastisols undergo the action of heat, a dissolution of the polymer in the plastifier is accomplished, with the formation of a more or less elastic homogeneous mass.

Plastisols are mostly used as insulating and sound-proofing coatings, e.g., in the automotive industry, by means of the application to different types of metal surfaces, towards which they exhibit however a very poor adhesion.

It has been known for a long time from the common experience that such an adhesion is increased if to the plastisol polyamidic resins, which are homogeneously dispersible therein, are added.

According to the known art, suitable to that purpose have resulted the polyaminoamide and polyaminoamidoimidazoline resins, which are prepared by means of the condensation of alifatic polyamines with polycarboxylic acids obtained from the polymerization of the unsaturated fatty acids.

Such polyaminoamide and polyaminoamidoimidazoline resins, as prepared with alifatic amines, although they fulfil the function of increasing, to a different extent according to their composition, the adhesion of plastisols to the surfaces to be coated, show the drawback of imparting to the end coating a more or less intense brown color, which is developed during the thermal treatment.

By means of the present invention is demonstrated on an experimental basis that, if instead of the alifatic polyamines, piperazines and/or some derivatives thereof, such as aminoethylpiperazine is used, by following particular formulation criteria which shall be disclosed hereinunder, the polyaminoamide resins which are obtained, besides to excellently fulfilling the function of acting as adhesion promoter for the plastisol, do not give rise to the drawback of altering the color of the end coating, as it has hereinabove described.

The object of the present invention are therefore adhesion promoters for plastisols of polyvinyl polymers or copolymers, characterized in that they are constituted by polyaminoamide resins obtained by means of the condensation of:

1 equivalent of polycarboxylic acids, obtained by means of the polymerization of unsaturated fatty acids, of composition comprised within the following ranges: 0–2% monomers, 10–50% dimers, 50–90% trimers, with from 1.0 to 2.2 equivalents of an heterocyclic amine of the general formula

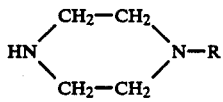

wherein R can be H or an alkylamino group —R'—$NH_2$, wherein R' is a saturated alifatic chain.

Among the hereinabove disclosed cycloalifatic amines, piperazine and aminoethylpiperazine are preferred.

The condensation process in the preparation of the resins according to the invention consists in heating the polycarboxylic acids and the amines as described together with each other, at temperatures not lower than 120° C. and preferably comprised within the range of from 150° to 230° C. for a time period long enough to eliminate all condensation water, and then applying vacuum to complete the reaction, and removing the amine which is remained unchanged.

The polyaminoamide resins according to the invention can be used as adhesion promoters for plastisols both as such and in solution.

Both the concentration of the solution, and the type of solvent may be varied according to the viscosity of the resin and to its solubility.

The solvents suitable to that purpose can be selected within a broad range of organic products, such as hydrocarbons, the chloro- and nitro-derivatives thereof, alcohols, polyols, esters, ketones, amines and amides.

To the purpose of better describing the resins according to the invention, some examples of preparation thereof, as numbered from 4 to 11, which are in no way to be considered as limitative, are reported hereinunder.

Such examples are preceded by examples, as numbered from 1 to 3, relating to the preparation of resins according to the known art; these latter are reported to comparison purposes with the resins according to the invention, as it shall be disclosed in the following.

EXAMPLE 1

Polyaminoamide resin from polymerized fatty acids and alifatic amine

285 Parts by weight (1 equivalent) of polymerized fatty acids (as obtained from unsaturated fatty acids of 18 carbon atoms, having the following composition: 10% monomers, 74% dimers, 16% trimers) are heated, while being stirred, with 138.7 parts by weight (1.9 equivalents) of triethylenetetramine, until they reach the temperature of 210° C., and are then held at such a temperature, the reaction water being distilled off, for 1 hour, vacuum is then applied (70–72 mmHg), the temperature of 210° C. being maintained for a further hour, after which the heating is disconnected, and the obtained resin, having an amine number (mg of KOH/g, as determined by potentiometric titration with perchloric acid) of from 340 to 360, is discharged.

EXAMPLE 2

Polyaminoamide resin from polymerized fatty acids and alifatic polyamine.

285 Parts by weight (1 equivalent) of polymerized fatty acids (as obtained from unsaturated $C_{18}$ fatty acids, having the folllowing composition: 4% monomers, 61% dimers, 35% trimers) are heated, under stirring, with 156.95 parts by weight (2.15 equivalents) of triethylenetetramine under the same conditions, and within the same periods as disclosed in Example 1.

The obtained resin has an amine number comprised within the range of from 380 to 410.

EXAMPLE 3

Polyaminoamidoimidazoline resin from polymerized fatty acids and alifatic polyamine.

The same amounts of polymerized fatty acids and of triethylenetetramine as disclosed in Example 2 are heated, while being stirred, until they reach the temperature of 230° C., and are kept at said temperature, the reaction water being distilled off, for 1 hour, vacuum (70–72 mmHg) is then applied, the temperature being maintained for the time necessary for the formation inside the resin of at least 80% of imidazoline (as determined by I.R. spectroscopy), after which the heating is disconnected and the obtained resin, having an amine number comprised within the range of from 380 to 480, is discharged.

EXAMPLE 4

Polyaminoamide resin from polymerized fatty acids and piperazine.

285 Parts by weight (1 equivalent) of polymerized fatty acids (as obtained from $C_{18}$ unsaturated fatty acids, having the following composition: 15% dimers, 85% trimers) are heated under stirring with 86 parts by weight (2 equivalents) of piperazine, until they reach the temperature of 180° C., and are kept at such a temperature until the maximum neutralization of acidity (about 5 mg of KOH/g) is obtained, which takes place within a time of about 4 hours.

The heating is then disconnected, and the resin, having an amine number comprised within the range of from 140 to 150, is unloaded.

EXAMPLE 5

Polyaminoamide resin from polymerized fatty acids and piperazine.

The same components, in the same ratio as shown in Example 4, are heated under stirring, until they reach the temperature of 180° C., and are held at such a temperature for 2 hours, vacuum is then applied (70–72 mmHg), with the temperature being maintained for a further hour.

The heating is then disconnected, and the resin, having an amine number of from 80 to 100, is discharged.

EXAMPLE 6

Polyaminoamidic resin from polymerized fatty acids and piperazine.

285 Parts by weight (1 equivalent) of polymerized fatty acids (as obtained from $C_{18}$ unsaturated fatty acids having the following composition: 20% monomers, 12% dimers, 68% trimers) are heated while being stirred with 86 parts by weight (2 equivalents) of piperazine, until the temperature of 180° C. is reached, the process being then continued under the same conditions as disclosed in Example 5.

The obtained resin has an amine number comprised within the range of from 80 to 100.

EXAMPLE 7

Polyaminoamide resin from polymerized fatty acids and piperazine.

285 Parts by weight (1 equivalent) of polymerized fatty acids (as obtained from $C_{18}$ unsaturated fatty acids, having the following composition: 2% monomers, 80% dimers, 18% trimers) are heated, under stirring, with 86 parts by weight (2 equivalents) of piperazine, until they reach the temperature of 180° C., the process being then continued under the same conditions as disclosed in Example 5.

The obtained resin has an amine number of from 80 to 100.

EXAMPLE 8

Polyaminoamide resin from polymerized fatty acids and piperazine.

285 Parts by weight (1 equivalent) of polymerized fatty acids (as obtained from $C_{18}$ unsaturated fatty acids and having the following composition: 1% monomers, 47% dimers, 52% trimers) are heated, while being stirred, with 80 parts by weight of piperazine, until the temperature of 180° C. is reached, by operating under the same conditions as disclosed in Example 5.

The resin obtained has an amine number within the range of from 80 to 90.

EXAMPLE 9

Polyaminoamide resin from polymerized fatty acids and piperazine.

285 Parts by weight (1 equivalent) of polymerized fatty acids (as obtained from $C_{18}$ unsaturated fatty acids having the following composition: 2% monomers, 80% dimers, 18% trimers) are heated under stirring with 51.6 parts by weight (1.2 equivalents) of piperazine, until they reach the temperature of 180° C., the process being carried out under the same conditions as of Example 5.

The obtained resin has an amine number of from 50 to 60.

EXAMPLE 10

Polyaminoamide resin from polymerized fatty acids and aminoethylpiperazine.

285 Parts by weight (1 equivalent) of polymerized fatty acids (obtained from unsaturated fatty acids and having the following composition: 15% dimers, 85% trimers) are heated, while being stirred, with 129 parts by weight (2 equivalents) of aminoethylpiperazine, until the temperature of 180° C. is reached, the process being carried out under the same conditions as disclosed in Example 5. The obtained resin has an amine number of from 260 to 280.

EXAMPLE 11

Polyaminoamide resin from polymerized fatty acids and aminoethylpiperazine.

285 Parts by weight (1 equivalent) of polymerized fatty acids as disclosed in Example 10 are heated, while being stirred, with 100 parts by weight (1.55 equivalents) of aminoethylpiperazine, until they reach the temperature of 180° C., the process being carried out under the same conditions as disclosed in Example 5.

The resin obtained has an amine number comprised within the range of from 195° to 205° C.

The products obtained according to the examples described have been submitted to an application test, as adhesion promoters, on a plastisol of the following % composition:

Polyvinyl chloride: 22
Dioctyl phthlate: 28
Calcium carbonate: 50 to which the 1% of adhesion promoter has then been added. The samples of plastisols with each one of the adhesion promoters, as obtained according to the examples described, have been compared as for the adhesion value, and for the color stability, with 30-minute baking, at different temperatures.

The adhesion tests have been carried out by submitting to the tensile shear strength test two steel specimens of mm 100×25 in size, surface-roughened by means of emery cloth, bonded by means of a layer of 1 mm in thickness of the plastisol being tested, for an area of 500 mm² and baked for 30 minutes at the predetermined temperature.

The adhesion strength, obtained from the average of 5 tests, is expressed at kg/cm² and the color stability value is expressed by means of a visual evaluation, as indicated with U=unaltered; Y=discoloured to a yellow color, followed by the + symbol repeated from once to three times, according to the intensity of the yellow colour obtained.

The results obtained from such tests are shown in the following Table:

| Baking Temperature | 120° C. | | 140° C. | | 160° C. | |
| --- | --- | --- | --- | --- | --- | --- |
| | Adhesion | Color | Adhesion | Color | Adhesion | Color |
| Ex. Nr 1 | 4.4 | Y | 5.8 | Y+ | 7.4 | Y++ |
| Ex. Nr 2 | 4.9 | Y | 6.7 | Y+ | 8.0 | Y++ |
| Ex. Nr 3 | 5.4 | Y | 6.8 | Y+ | 8.9 | Y++ |
| Ex. Nr 4 | 4.1 | U | 4.8 | U | 7.3 | U |
| Ex. Nr 5 | 6.8 | U | 7.6 | U | 9.0 | U |
| Ex. Nr 6 | 3.9 | U | 4.4 | U | 7.0 | U |
| Ex. Nr 7 | 2.6 | U | 3.0 | U | 5.8 | U |
| Ex. Nr 8 | 5.4 | U | 6.4 | U | 8.2 | U |
| Ex. Nr 9 | 4.5 | U | 6.8 | U | 7.0 | U |
| Ex. Nr 10 | 4.2 | U | 4.9 | U | 7.4 | U-Y |
| Ex. Nr 11 | 6.5 | U | 7.7 | U | 9.5 | Y |

As it is shown by such results, with all the products according to the invention (adhesion promoters of the examples from 4 to 11), plastisols are obtained whose color remains unchanged at all tested temperatures.

Tests carried out at temperatures higher than indicated in the Table (230° C.) have shown that, whilst the plastisols containing the adhesion promoters as of Examples from 1 to 3 become completely black, those containing the adhesion promoters according to the invention are discolored to a yellow color to a not greater extent than plastisol free from adhesion promoter.

Such a property occurs also in the case of the socalled "low temperature" plastisols, which, due to their particularly high content in polyvinyl acetate are particularly sensible to the discoloring action of the polyaminoamide adhesion promoters of the type as of Examples from 1 to 3; if to such plastisols adhesion promoters according to the invention are added, they can be treated at higher temperatures than those prescribed, without any color alterations.

As for the adhesion, the data contained in the Table show that the adhesion promoters according to the invention, if obtained by means of suitable process and formulation (Example Nos. 5 and 11) can yield better results than those to be obtained with known polyaminoamide adhesion promoters of commerce (Examples from 1 to 3).

We claim:

1. Adhesion promoters for plastisols of polymers or copolymers of polyvinyl chloride, characterized in that they are constituted by fluid polyaminoamide resins having decolorization resistance when associated polymers are subject to heat treatment, said polyaminoamide resins being obtained by means of the condensation of:
    1 equivalent of polycarboxylic acids, as obtained by means of the polymerization of unsaturated fatty acids, of composition comprised within the following ranges: 0–2% monomers, 10–50% dimers, 50–90% trimers, with
    from 1.0 to 2.2 equivalents of an heterocyclic amine of the general formula

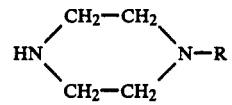

wherein R can be H or an alkylamino group —R'—NH₂, wherein R' is a saturated aliphatic chain.

2. Adhesion promoters for plastisols according to claim 1, characterized in that the polycarboxylic acids used are obtained from unsaturated fatty acids of 18 carbon atoms and have the following composition: 15% dimers, 85% trimers.

3. Adhesion promoters for plastisols according to claim 1, characterized in that the heterocyclic amine used is piperazine.

4. Adhesion promoters for plastisols according to claim 3, characterized in that the equivalent ratio of polycarboxylic acid to amine is of 1 to 2.

5. Adhesion promoters for plastisols according to claim 1, characterized in that the heterocyclic amine is aminoethylpiperazine.

6. Adhesion promoters for plastisols according to claim 5, characterized in that the equivalent ratio of polycarboxylic acid to the heterocyclic amine is of 1 to 1.2.

7. Adhesion promoters for plastisols according to claim 1, characterized in that they are dissolved in an organic solvent.

8. Adhesion promoters for plastisols according to claim 7, characterized in that they are dissolved at a concentration comprised within the range of from 10% to 95%, as expressed as concentration by weight.

9. Plastisols characterized in that they contain adhesion promoters in the form of a fluid polyaminoamide resin having decolorization resistance when associated polymers are subject to heat treatment, said polyaminoamide resins being obtained by means of the condensation of:
    1 equivalent of polycarboxylic acids, as obtained by means of the polymerization of unsaturated fatty acids, of composition comprised within the following ranges: 0–2% monomers, 10–50% dimers, 50–90% trimers, with
    from 1.0 to 2.2 equivalents of an heterocyclic amine of the general formula

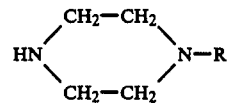

wherein R can be H or an alkylamino group —R'—NH₂, wherein R' is a saturated aliphatic chain.

10. Process for the preparation of fluid polyaminoamide resins having decolorization resistance when associated polymers are subject to heat treatment, said polyaminoamide resins being obtained by means of the condensation of:
    1 equivalent of polycarboxylic acids, as obtained by means of the polymerization of unsaturated fatty acids, of composition comprised within the following ranges: 0–2% monomers, 10–50% dimers, 50–90% trimers, with from 1.0 to 2.2 equivalents of an heterocyclic amine of the general formula

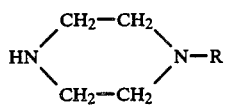

wherein R can be H or an alkylamino group —R'—NH$_2$, wherein R' is a saturated aliphatic chain, said process comprising the steps of effecting condensation of said polycarboxylic acid and of said heterocyclic amine at a temperature not lower than 120° C. and for a time long enough to eliminate reaction water, of applying a vacuum until the reaction is completed, and of withdrawl of unreacted amine.

11. Adhesion promoters according to claim 1 wherein said polymerized fatty acids and amines are in nonstoichiometric ratio which preserve free amine groups for promoting adhesion to plastisols.

* * * * *